3,590,038
PHENOTHIAZINYL-LOWER-ALKYLAMIDOXIMES
AND -GUANIDINES
Malcolm R. Bell, East Greenbush, N.Y., assignor to
Sterling Drug Inc., New York, N.Y.
No Drawing. Continuation-in-part of application Ser. No.
631,871, Apr. 19, 1967, which is a continuation-in-part
of application Ser. No. 519,458, Jan. 10, 1966, which
in turn is a continuation-in-part of application Ser. No.
345,846, Feb. 19, 1964. This application Nov. 26, 1968,
Ser. No. 779,211
Int. Cl. C07d 93/14
U.S. Cl. 260—243                                       18 Claims

ABSTRACT OF THE DISCLOSURE

New phenothiazinyl-lower-alkylamidoximes and -guanidines having useful sedative and psychomotor stimulant activities.

This application is a continuation-in-part of my prior copending application Ser. No. 631,871, filed Apr. 19, 1967, now abandoned, and which in turn is a continuation-in-part of my prior copending application Ser. No. 519,458, filed Jan. 10, 1966, now U.S. Patent 3,478,039, patented Nov. 11, 1969, which in turn is a continuation-in-part of my prior copending application Ser. No. 345,846, filed Feb. 19, 1964, now U.S. Patent 3,354,174, patented Nov. 21, 1967.

This invention relates to the field of amidoximes and guanidines, their acid-addition salts, and to intermediates and processes therefor.

The compounds of the invention are represented by the general formulas:

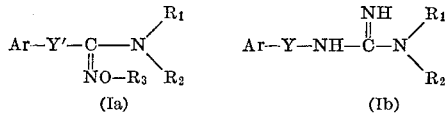

(Ia)                            (Ib)

wherein Ar is 10-phenothiazinyl; $R_1$ is hydrogen, lower-alkyl, lower-alkenyl, lower-alkynyl, benzyl, lower-alkanoyl, benzoyl, or hydroxy; $R_2$ is hydrogen, lower-alkyl, lower-alkenyl, lower-alkynyl, or benzyl; $R_3$ is hydrogen, lower-alkanoyl, benzoyl, lower-alkyl, or benzyl; Y', in the compounds of Formua Ia, is alkylene containing from one to five carbon atoms; and Y, in the compounds of Formula Ib, is alkylene containing from two to six carbon atoms. Moreover, the alkylene group, Y' can also be substituted on any of the carbon atoms thereof, except the carbon atom adjacent to the phenothiazine nitrogen atom, by a hydroxy group. The more convenient synthetic methods for the preparations of the latter are based on use of an aldehyde cyanohydrine of the nitrile, Ar—Y'—CN in the general procedures described herein, and these methods afford those compounds where the hydroxy group is attached to the carbon atom adjacent to the amidoxime group of the compounds of Formula Ia, and these compounds are preferred.

In the above Formulas Ia and Ib, $R_1$ and $R_2$ represent lower-alkenyl, e.g. 1-(2-propenyl), 1-(2-methyl-2-propenyl), and the like, or lower-alkynyl, e.g. 1-(2-propynyl) or 1-(2-butynyl).

The compounds of Formula Ia where Y' is a hydroxyalkylene group having the hydroxy group attached to the carbon atom adjacent to the amidoxime group have the structure:

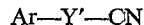

where $R_1$, $R_2$, $R_3$, and Ar have the meanings given above, and Y" is $C_mH_{2m}$ where $m$ is an integer from 1 to 4.

In the above general Formulas Ia and Ib, when $R_1$, $R_2$, or $R_3$ represent lower-alkyl, the lower-alkyl moiety can be straight or branched and can contain from one to about four carbon atoms. Thus $R_1$, $R_2$, and $R_3$ represent, inter alia, methyl, ethyl, isopropyl, or n-butyl.

In the above general Formula Ia, when $R_1$ and $R_3$ are lower-alkanoyl, they can be straight or branched and can contain from one to about four carbon atoms. Thus $R_1$ and $R_3$ represent, inter alia, formyl, acetyl, propionyl, or isobutyryl.

In the above general Formulas Ia and Ib, Y and Y' represent alkylene which can be straight or branched and thus stand, inter alia, for methylene, 1,2-ethylene, 2-methylethylene, 1,3-propylene, 2-methyl-1,4-butylene, 1,5-pentylene, and 1,6-hexylene.

In the above general Formulas Ia and Ib, when $R_1$, $R_2$, or $R_3$ represent benzyl or in the compounds of Formula Ia, when $R_1$ or $R_3$ represent benzoyl, the benzene ring thereof can be unsubstituted or can bear one or more substituents of low molecular weight and of such nature that they do not interfere with or take part in the reactions, to be described hereinafter, used in the preparation of the compounds. Moreover, the nucleus of the 10-phenothiazinyl group, Ar, in any of the compounds of Formulas Ia or Ib can also be further substituted in either or both the benzenoid rings thereof by one or more of such substituents. Examples of such substituents include halogen, lower-alkyl, lower-alkoxy, lower-alkylmercapto, lower-alkylsulfinyl, lower-alkylsulfonyl, trifluoromethyl, methylenedioxy, lower-alkanoyl, cyano, sulfamoyl, di-lower-alkylsulfamoyl, and the like. In each of the foregoing, the lower-alkyl bearing substituents can have from one to four carbon atoms and can be straight or branched as illustrated by but not limited to methyl, ethyl, n-propyl, isopropyl, n-butyl, isobutyl, sec.-butyl, and the like.

Particularly preferred compounds of the invention are those of Formula Ia wherein $R_1$ and $R_2$ are each hydrogen or lower-alkyl, and $R_3$ is hydrogen, and particularly preferred are those wherein $R_1$, $R_2$, and $R_3$ have the latter meanings, Y' is methylene or ethylene, and the phenothiazine nucleus, Ar, is substituted by a halogen atom, e.g. chloro. Thus specifically preferred compounds, are, for example, α-(2 - chloro-10-phenothiazinyl)acetamidoxime, β-(2-chloro-10-phenothiazinyl)propionamidoxime, α - (2-chloro-10-phenothiazinyl)-N-methylacetamidoxime, β-(2-chloro-10-phenothiazinyl)-N-methylpropionamidoxime, α-(2 - chloro-10-phenothiazinyl)-N,N-dimethylacetamidoxime, and β-(2-chloro-10-phenothiazinyl)-N,N-dimethylpropionamidoxime.

The compounds of Formula Ia where $R_1$, $R_2$, and $R_3$ are hydrogen are prepared by reacting a 10-phenothiazinyl-lower-alkanonitrile with hydroxylamine (suitably in the form of a hydrohalide salt) in an organic solvent inert under the conditions of the reaction and in the presence of a base, for example alkali metal hydroxides, alkoxides, or carbonates. A preferred base is an alkali metal carbonate, for example, potassium carbonate or sodium carbonate. Suitable organic solvents are methanol, ethanol, isopropanol, benzene, toluene, and the like. A preferred solvent is ethanol. The reaction is represented by the equation:

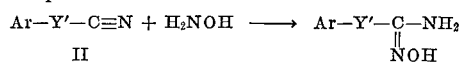

where Ar and Y' have the meanings given above.

The 10-phenothiazinyl-lower-alkanonitriles of Formula II required as intermediates in the above-described procedure are prepared by a variety of methods. One method involves the direct alkylation on the nitrogen atom of the phenothiazine nucleus in the presence of an acid-acceptor, for example sodium hydride or sodamide, using an appropriate halo-lower-alkanonitrile.

A second method for the preparation of the 10-phenothiazinyl-lower-alkanonitriles of Formula II in which the alkylene group, Y', is 1,2-ethylene comprises reacting acrylonitrile with a phenothiazine, Ar, in the presence of a strong base as catalyst, for example, potassium t-butoxide, sodium hydride, organo ammonium hydroxides, for example Triton B®, and the like.

The compounds of Formula Ia where $R_1$ is lower-alkyl, lower-alkenyl, lower-alkynyl, or benzyl and $R_2$ is hydrogen, or where both $R_1$ and $R_2$ are lower-alkyl, lower-alkenyl, lower-alkynyl, or benzyl are prepared by reacting a hydroxamic acid chloride derivatives of Formula III below, wherein $R_3$, Ar, and Y' have the meanings given hereinabove, with a lower-alkylamine, a lower-alkenylamine, a lower-alkynylamine, or a benzylamine, or such amine where $R_1$ and $R_2$ are each separately lower-alkyl, lower alkenyl, lower alkynyl, or benzyl. The compounds of Formula Ia where $R_1$ is hydroxy are prepared by reacting a hydroxamic chloride derivative of Formula III below, wherein Ar, Y' and $R_3$ have the meanings given hereinabove, with hydroxylamine, an N-lower-alkylhydroxylamine, an N-lower-alkenylhydroxylamine, an N-lower-alkynylhydroxylamine, or an N - benzylhydroxylamine, $R_2NHOH$. These reactions are represented by the following equations:

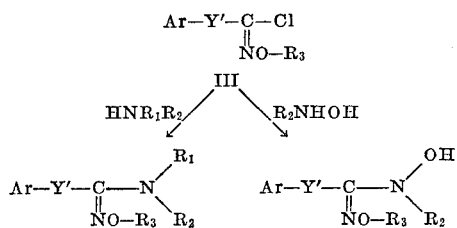

A preferred starting material of Formula III is one wherein $R_3$ is benzyl. The products can then be debenzylated with hydrogen over a suitable catalyst, for example, palladium-on-charcoal or Raney nickel, to produce the compounds of Formula Ia where $R_3$ is hydrogen.

The aryl - lower - alkylhydroxamic chloride O-benzyl ethers of Formula III ($R_3$ is $CH_2C_6H_5$) are prepared by reacting the corresponding aryl-lower-alkanoamidoxime O-benzyl ether of Formula Ia, where $R_1$ and $R_2$ are hydrogen and $R_3$ is benzyl, with an alkali metal nitrite in the presence of hydrochloric acid under diazotization conditions. The reaction is represented by the following equation:

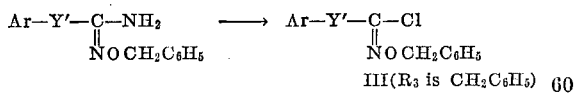

III($R_3$ is $CH_2C_6H_5$)

where Ar and Y' have the meanings given above.

The aryl-lower-alkylhydroxamic chlorides of Formula III where $R_3$ is hydrogen are also conveniently prepared by the reaction of chlorine in chloroform with the corresponding aldoxime.

The compounds of Formula Ia where $R_3$ is lower-alky- or benzyl are prepared by reacting the corresponding amidoxime, where $R_3$ is hydrogen, with an alkali metal hydride in a suitable organic solvent inert under the conditions of the reaction, for example, dimethylformamide, and reacting the resulting alkali metal salt with a lower-alkyl halide or a benzyl halide. Alternatively, the alkali metal salt can be prepared by reacting the amidoxime with an alkali metal hydroxide in an aqueous or alcoholic medium, e.g. methanol, ethanol, or isopropanol. The reaction is represented by the equation:

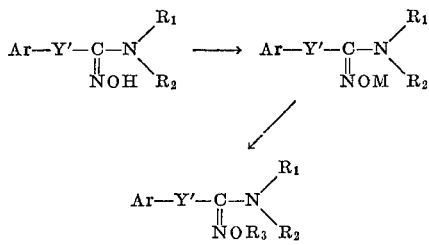

where $R_1$, $R_2$, $R_3$, Ar, and Y' have the meanings given above, except that $R_1$ is not hydroxy, and M represents an ion of an alkali metal.

The compounds of Formula Ia where $R_1$ is lower-alkanoyl or benzoyl are prepared by reacting the corresponding amidoxime ethers, where $R_3$ is lower-alkyl or benzyl and $R_1$ is hydrogen, with a lower-alkanoyl or benzoyl halide. When it is desired to prepare the compounds of Formula Ia where $R_1$ is lower-alkanoyl or benzoyl and $R_3$ is hydrogen, it is necessary to carry out the reaction with the lower-alkanoyl or benzoyl halide using the amidoxime O-benzyl ether ($R_3$ is benzyl). Subsequent catalytic debenzylation affords the compounds where $R_3$ is hydrogen.

The compounds of Formula Ia where $R_3$ is lower-alkanoyl or benzoyl and $R_1$ is hydrogen or lower-alkyl are prepared by reacting the corresponding amidoxime with a lower-alkanoic anhydride or with a benzoic anhydride, as the case may be, in the presence of a base such as pyridine. The reaction is preferably carried out in an excess of pyridine, as the solvent medium, and at a temperature in the range from about 0° C. to about 50° C.

The compounds of Formula Ia where Y' is a hydroxyalkylene group with the hydroxy group attached to the carbon atom adjacent to the amidoxime group are prepared by reacting the corresponding cyanohydrin with hydroxylamine using the same conditions as described above for the preparation of the compounds of Formula Ia where Y' is alkylene. The reaction is represented by the equation:

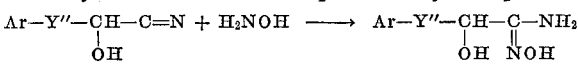

where Ar and Y" have the meanings given above.

The intermediate cyanohydrins are prepared by reaction of hydrogen cyanide with the corresponding aryl-lower-alkanaldehyde.

The compounds of Formula Ib are prepared by reacting a lower-alkyl isothiouronium halide with the corresponding 10-phenothiazinyl-lower-alkylamine of Formula IV below. The reaction is preferably carried out in an aqueous or lower-alkanol medium at the reflux temperature thereof. The reaction is represented by the equation:

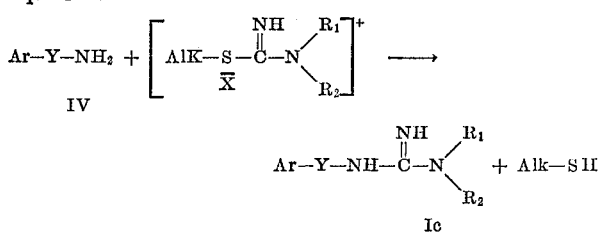

where Ar, $R_1$, $R_2$, and Y have the meanings given above, Alk represents lower-alkyl, and X represents a halide anion.

The 10-phenothiazinyl-lower-alkylamines of Formula IV are prepared by catalytic hydrogenation of the corresponding 10-phenothiazinyl-lower-alkanonitriles of Formula II.

The novel compounds of the instant invention are the bases of Formulas Ia and Ib and the acid-addition salts of said bases, and said acid-addition salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or a different acid to give back the same or a different acid-addition salt. Thus the novel bases and all of their acid-addition salts are readily interconvertible.

It will thus be appreciated that Formulas Ia and Ib not only represent the structural configurations of the bases of my invention but each is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively they can be converted to pharmaceutically-acceptable acid-addition salts by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new amidoximes and guanidines, and not in any particular acid anion associated with the salt forms of the compounds; rather, the acid anions, which can be associated in the salt forms, are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of the invention in standard pharmacological test procedures has demonstrated that they possess psychomotor stimulant and hexobarbital potentiation activities thus indicating their usefulness as C.N.S. stimulants and sedatives. Psychomotor stimulant activity was determined using the standard activity cage method of Dews, Brit. J. Pharmacol., 8, 46–48 (1953), while hexobarbital potentiation activity was determined using the method of Wylie, Proc. Soc. Exptl. Biol. Med. 98, 716–718 (1958). In psychomotor stimulant and hexobarbital potentiation tests, the compounds are active in the dose range from 10 to 75 mg./kg. intraperitoneally or orally.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

EXAMPLE 1

α-[10-(2-chlorophenothiazinyl)]acetamidoxime
[Ia: $R_1, R_2$, and $R_3$ are H; Y' is $CH_2$]

To a suspension of 10.2 g. (0.22 mole) of a 52% mineral oil suspension of sodium hydride in one liter of dimethylformamide was added in portions 46.8 g. (0.20 mole) of 2-chlorophenothiazine, and the mixture was stirred at room temperature for one hour. The reaction mixture was then treated all at once with 14 ml. (16.7 g., 0.22 mole) of chloroacetonitrile, and the reaction was allowed to stand at room temperature for twenty hours. The grey solid which had separated was collected, washed once with hot water, dried, taken into benzene/hexane and filtered to remove the solid which had separated. The filtrate was concentrated to a small volume, diluted with hexane and again the precipitated solid was removed by filtration. The filtrate from the latter crystallization was again concentrated to a small volume, allowed to stand at room temperature, and the solid which separated was collected and recrystallized twice from methanol giving 4.5 g. of 2-[10-(2-chlorophenothiazinyl)]acetonitrile, M.P. 120–122° C. (corr.)

Analysis.—Calcd. for $C_{14}H_9ClN_2S$ (percent): C, 61.42; H, 3.31; S, 11.71. Found (percent): C, 61.38; H, 3.20; S, 11.58.

A mixture of 4.6 g. (0.0168 mole) of α-[10(2-chlorophenothiazinyl)]acetonitrile, 2.4 g. (0.034 mole) of hydroxylamine, and 7.2 g. (0.08 mole) of sodium carbonate in 125 ml. of ethanol was heated under reflux and stirred for fifteen hours, then diluted with an additional 50 ml. of hot ethanol, and filtered. The filtrate was concentrated to dryness, and the solid residue was slurried with pentane, collected, dried, and recrystallized from ethanol giving 2.0 g. of α-[10-(2-chlorophenothiazinyl)]acetamidoxime, M.P. 193–194.6° C. (corr.)

Analysis.—Calcd. for $C_{14}H_{12}ClN_3OS$ (percent): C, 54.99; H, 3.96; Cl, 11.60. Found (percent): C, 55.27; H, 3.88; Cl, 11.88.

EXAMPLE 2

β-[10-(2-chlorophenothiazinyl)]propionamidoxime [Ia: $R_1$, $R_2$, and $R_3$ and H; Y′ is $CH_2CH_2$]

A mixture of 55 g. (0.024 mole) of 2-chlorophenothiazine in 200 ml. of acrylonitrile containing 5 drops of Triton B® was heated under reflux with stirring for one half hour. The product which separated on cooling was collected and recrystallized from hot ethyl acetate to give 37 g. of β-[10-(2-chlorophenothiazinyl)]propionitrile, M.P. 188.5–190° C. (uncorr.).

A solution of 35 g. (0.12 mole) of β-[10-(2-chlorophenothiazinyl)]propionitrile, 17 g. (0.24 mole) of hydroxylamine hydrochloride, and 52 g. (0.49 mole) of sodium carbonate in two liters of ethanol and 500 ml. of benzene was refluxed and stirred for twenty hours, filtered while hot, and the filtrate concentrated to dryness to give a light tan gum which was crystallized from 150 ml. of warm ethyl acetate giving two crops of crystals totaling 20 g. of crude material which, on recrystallization twice from benzene, gave 12.8 g. of β-[10-(2-chlorophenothiazinyl)]acetamidoxime, M.P. 147.8–149.0° C. (corr.).

Analysis.—Calcd. for $C_{15}H_{14}ClN_3OS$ (percent): C, 56.33; H, 4.41; Cl, 11.09; N, 13.14. Found (percent): C, 56.28; H, 4.53; Cl, 11.09; N, 12.82.

EXAMPLE 3

α-[10-(2-chlorophenothiazinyl)]acetamidoxime O-benzyl ether [Ia: $R_1$ and $R_2$ are H; $R_3$ is $C_6H_5CH_2$; Y′ is $CH_2$]

By reacting α-[10-(2-chlorophenothiazinyl)]acetamidoxime in the presence of sodium hydroxide with benzyl chloride, 4-methylmercaptobenzyl chloride, 4-methylsulfonylbenzyl chloride, or 4-trifluoromethylbenzyl chloride, there can be obtained, respectively, α-[10-(2-chlorophenothiazinyl)]acetamidoxime O-benzyl ether, O-(4-methylmercaptobenzyl) ether, O-(4-methylsulfonylbenbyl) ether or O-(4-trifluoromethylbenzyl) ether.

EXAMPLE 4

α-[10-(2-chlorophenothiazinyl)]acetamidoxime O-methyl ether [Ia: $R_1$ and $R_2$ and H; $R_3$ is $CH_3$; Y′ is $CH_2$]

By reacting α-[10-(2-chlorophenothiazinyl)]acetamidoxime with methyl iodide in the presence of sodium hydroxide, there can be obtained α-[10-(2-chlorophenothiazinyl)]acetamidoxime O-methyl ether.

Simparly, reaction of α-[10-(2-chlorophenothiazinyl)]acetamidoxime with butyl bromide in the presence of sodium hydroxide affords α-[10-(2-chlorophenothiazinyl)]acetamidoxime O-butyl ether.

EXAMPLE 5

α-[10-(2-chlorophenothiazinyl)]-N,N-diethylacetamidoxime [Ia: $R_1$ and $R_2$ are $C_2H_5$; $R_3$ is H; Y′ is $CH_2$]

By reacting the α-[10-(2-chlorophenothiazinyl)] acetamidoxime O-benzyl ether described above in Example 3 with sodium nitrite in the presence of hydrochloric acid at a temperature from about 0° C. to about 5° C., there can be obtained α-[10-(2-chlorophenothiazinyl)]acetohydroxamic chloride O-benzyl ether. By reacting the latter with diethylamine, there can be obtained α-[10-(2-chlorophenothiazinyl)]-N,N-diethylacetamidoxime O - benzyl ether. By reducing the latter with hydrogen over a palladium-on-charcoal catalyst, there can be obtained α-[10-(2-chlorophenothiazinyl)]-N,N-diethylacetamidoxime.

Similarly, by reaction of α-[10-(2-chlorophenothiazinyl)]acetohydroxamic chloride O-benzyl ether with dibutylamine and reduction of the resulting N,N-dibutylacetamidoxime O-benzyl ether with hydrogen over a palladium-on-charcoal catalyst, there can be obtained α-[10-(2 - chlorophenothiazinyl)] - N,N - dibutylacetamidoxime.

EXAMPLE 6

α-[10-(2-chlorophenothiazinyl)]acetohydroxamic acid oxime[Ia: $R_1$ is HO; $R_2$ and $R_3$ are H; Y′ is $CH_2$]

By reacting the α-[10-(2-chlorophenothiazinyl)]acetohydroxamic chloride O-benzyl ether described above in Example 5 with hydroxylamine, there can be obtained α-[10-(2 - chlorophenothiazinyl)]acetohydroxamic acid oxime O-benzyl ether. By reducing the latter with hydrogen over a palladium-on-charcoal catalyst, there can be obtained α-[10-(2 - chlorophenothiazinyl)]acetohydroxamic acid oxime. Similarly by replacing the hydroxylamine by N-methylhydroxylamine, there can be obtained α - [10 - (2 - chlorophenothiazinyl)] - N - methylacetohydroxamic acid oxime.

EXAMPLE 7

α-[10-(2 - chlorophenothiazinyl)]-N-acetylacetamidoxime O-acetate [Ia: $R_1$ and $R_3$ are $CH_3CO$; $R_2$ is H; Y′ is $CH_2$]

By reaction of α-[10-(2-chlorophenothiazinyl)]acetamidoxime with acetic anhydride in the presence of pyridine, there can be obtained α-[10-(2-chlorophenothiazinyl)]-N-acetylacetamidoxime O-acetate.

Similarly by reaction of α-[10 - (2 - chlorophenothiazinyl)]acetamidoxime with isobutyric anhydride, there can be obtained α-[10-(2-chlorophenothiazinyl)]-N-isobutyrylacetamidoxime O-isobutyrate.

EXAMPLE 8

β-[10-(2-chlorophenothiazinyl)] - α - methylpropionamidoxime [Ia: $R_1$, $R_2$, and $R_3$ are H; Y′ is $CH_2CH(CH_3)$]

Reaction of 2-chlorophenothiazine with α-methylacrylonitrile in benzene in the presence of Triton B® according to the procedure described above in Example 2 affords β-[10 - (2 - chlorophenothiazinyl)]-α-methylpropionitrile. Reaction of the latter with hydroxylamine in ethanol in the presence of sodium carbonate according to the procedure described above in Example 1 affords β-[10 - (2 - chlorophenothiazinyl)]-α-methylpropionamoxime.

EXAMPLE 9

ε-[10-(2-chlorophenothiazinyl)]caproamidoxime [Ia: $R_1$, $R_2$, and $R_3$ are H; Y′ is $(CH_2)_5$]

Reaction of 2 - chlorophenothiazine with ε-bromocapronitrile in dimethylformamide in the presence of sodium hydride according to the procedure described above in Example 1 affords ε-[10-(2-chlorophenothiazinyl)]capronitrile. Reaction of the latter with hydroxylamine in ethanol in the presence of sodium carbonate using the procedure described above in Example 1 affords ε-[10-(2-chlorophenothiazinyl)]caproamidoxime.

EXAMPLE 10

γ-[10-(2-chlorophenothiazinyl)]butyramidoxime [Ia: $R_1$, $R_2$, and $R_3$ are H; Y is $(CH_2)_3$]

Reaction of 2-chlorophenothiazine with γ-bromobutyronitrile in dimethylformamide in the presence of sodium hydride using the procedure described above in Example 1 affords γ-[10 - (2 - chlorophenothiazinyl)]butyronitrile. Reaction of the latter with hydroxylamine in ethanol in the presence of sodium carbonate using the procedure described above in Example 1 affords γ-[10-(2-chlorophenothiazinyl)]butyramidoxime.

EXAMPLE 11

α-[10 - (2 - chlorophenothiazinyl)]-N-benzyl-N-methylacetamidoxime [Ia: $R_1$ is $C_6H_5CH_2$; $R_2$ is $CH_3$; $R_3$ is H; Y′ is $CH_2$]

Reaction of α-[10 - (2 - chlorophenothiazinyl)]acetamidoxime with sodium nitrite in the presence of hydrochloric acid using the procedure described above in Example 5 and reaction of the resulting α-[10-(2-chlorophenothiazinyl)]acetohydroxamic chloride with N-benzyl-N-methylamine affords α-[10-(2-chlorophenothiazinyl)]-N-benzyl-N-methylacetamidoxime.

Similarly by reaction of α-[10 - (2 - chlorophenothiazinyl)]acetohydroxamic chloride with methylamine or N,N-dimethylamine, there is obtained α-[10-(2-chlorophenothiazinyl)]-N-methylacetamidoxime and α-[10-(2-chlorophenothiazinyl)]-N,N-dimethylacetamidoxime, respectively.

Similarly by reaction of α-[10-(2-chlorophenothiazinyl)]acetohydroxamic chloride with 2 - acetylbenzylamine, there is obtained α-[10-(2-chlorophenothiazinyl)]-N-(2-acetylbenzyl)acetamidoxime.

EXAMPLE 12

α-[10 - (2 - chlorophenothiazinyl)]-N,N-dibenzylacetamidoxime [Ia: $R_1$ and $R_2$ are $C_6H_5CH_2$; $R_3$ is H; Y' is $CH_2$]

By reaction of α-[10 - (2 - chlorophenothiazinyl)]-acetohydroxamic chloride with N,N-dibenzylamine, there is obtained α-[10 - (2 - chlorophenothiazinyl)]-N,N-dibenzylacetamidoxime.

EXAMPLE 13

α-[10 - (2 - chlorophenothiazinyl)]-N-benzoylacetamidoxime O-benzoate [Ia: $R_1$ and $R_3$ are $C_6H_5CO$; $R_2$ is H; Y' is $CH_2$]

By reacting α-[10 - (2 - chlorophenothiazinyl)]acetamidoxime with benzoic anhydride in the presence of pyridine, there is obtained α-[10 - (2 - chlorophenothiazinyl)]-N-benzoylacetamidoxime O-benzoate.

EXAMPLE 14

α-[10 - (2 - chlorophenothiazinyl)]-N-allylacetamidoxime [Ia: $R_1$ is $CH_2CH=CH_2$; $R_2$ and $R_3$ are H; Y' is $CH_2$]

By reaction of α-[10 - (2 - chlorophenothiazinyl)]-acetohydroxamic chloride with allylamine, there is obtained α-[10 - (2 - chlorophenothiazinyl)]-N-allylacetamidoxime.

EXAMPLE 15

α-[10 - (2 - chlorophenothiazinyl)]-N-propynylacetamidoxime [Ia: $R_1$ is $CH_2C\equiv CH$; $R_2$ and $R_3$ are H; Y' is $CH_2$]

Reaction of α-[10 - (2 - chlorophenothiazinyl)]acetohydroxamic chloride with propargylamine using the procedure described above in Example 5 affords α-[10-(2-chlorophenothiazinyl)]-N-propynylacetamidoxime.

Similarly, by reaction of α-[10 - (2 - chlorophenothiazinyl)]acetohydroxamic chloride with N,N-di-(1-methyl - 2 - propynyl)amine or N,N-di-(2-butynyl)amine there is obtained, respectively, α-[10 - (2 - chlorophenothiazinyl)]-N,N-di-(1 - methyl - 2 - propynyl)acetamidoxime and α-[10 - (2 - chlorophenothiazinyl)]-N,N-di-(2-butynyl)acetamidoxime.

EXAMPLE 16

By reaction of 2-trifluoromethylphenothiazine,
2-sulfamoylphenothiazine,
2-dimethylsulfamoylphenothiazine,
3-cyanophenothiazine,
2-acetylphenothiazine,
2-methoxyphenothiazine,
3-methylmercaptophenothiazine,
2-methylphenothiazine,
2-methylsulfonylphenothiazine,
2-methylsulfinylphenothiazine,
2-fluorophenothiazine,
2,3-dimethoxyphenothiazine, or
2,3-methylenedioxyphenothiazine with acrylonitrile in the presence of Triton B® using the procedure described above in Example 2, there is obtained, respectively, β-[10-(2-trifluoromethylphenothiazinyl)]propionitrile,
β-[10-(2-sulfamoylphenothiazinyl)]propionitrile,
β-[10-(2-dimethylsulfamoylphenothiazinyl)]propionitrile,
β-[10-(3-cyanophenothiazinyl)]propionitrile,
β-[10-(2-acetylphenothiazinyl)]propionitrile,
β-[10-(2-methoxyphenothiazinyl)]propionitrile,
β-[10-(3-methylmercaptophenothiazinyl)]propionitrile,
β-[10-(2-methylphenothiazinyl)]propionitrile,
β-[10-(2-methylsulfonylphenothiazinyl)]propionitrile,
β-[10-(2-methylsulfinylphenothiazinyl)]propionitrile,
β-[10-(2-fluorophenothiazinyl)]propionitrile,
β-[10-(2,3-dimethoxyphenothiazinyl)]propionitrile, or
β-[10-(2,3-methylenedioxyphenothiazinyl)]propionitrile.

By reacting the latter with hydroxylamine in ethanol in the presence of sodium carbonate using the procedure described above in Example 1, there can be obtained, respectively, β-[10-(2-trifluoromethylphenothiazinyl)]propionamidoxime,
β-[10-(2-sulfamoylphenothiazinyl)]propionamidoxime,
β-[10-(2-dimethylsulfamoylphenothiazinyl)]propionamidoxime,
β-[10-(3-cyanophenothiazinyl)]propionamidoxime,
β-[10-(2-acetylphenothiazinyl)]propionamidoxime,
β-[10-(2-methoxyphenothiazinyl)]propionamidoxime,
β-[10-(3-methylmercaptophenothiazinyl)]propionamidoxime,
β-[10-(2-methylphenothiazinyl)]propionamidoxime,
β-[10-(2-methylsulfonylphenothiazinyl)]propionamidoxime,
β-[10-(2-methylsulfinylphenothiazinyl)]propionamidoxime,
β-[10-(2-fluorophenothiazinyl)]propionamidoxime,
β-[10-(2,3-dimethoxyphenothiazinyl)]propionamidoxime, or
β-[10-(2,3-methylenedioxyphenothiazinyl)]propionamidoxime.

EXAMPLE 17

2-[10-(2-chlorophenothiazinyl)]ethylguanidine [Ib: $R_1$ and $R_2$ are H; Y is $CH_2CH_2$]

By reduction of the α-[10-(2-chlorophenothiazinyl)]acetonitrile described above in Example 1 with hydrogen in ethanol over a Raney nickel catalyst, there is obtained 2-[10-(2-chlorophenothiazinyl)]ethylamine.

By reaction of the latter with ethyl isothiouronium bromide in ethanol, there is obtained 2-[10-(2-chlorophenothiazinyl)]ethylguanidine.

EXAMPLE 18

3 - [10 - (2-chlorophenothiazinyl)]-N,N-dimethylpropylguanidine [Ib: $R_1$ and $R_2$ are $CH_3$; Y is $(CH_2)_3$]

By reduction of the β-[10-(2-chlorophenothiazinyl)]propionitrile described above in Example 2 with hydrogen over a Raney nickel catalyst as described above in Example 2 there is obtained 3-[10-(2-chlorophenothiazinyl)]propylamine.

By reaction of the latter with ethyl N,N-dimethyl isothiouronium bromide, there is obtained 3-[10-(2-chlorophenothiazinyl)]-N,N-dimethylpropylguanidine.

EXAMPLE 19

3 - [10 - 2-chlorophenothiazinyl)]-2-methyl-N,N-diallylpropylguanidine [Ib: $R_1$ and $R_2$ are $CH_2CH=CH_2$; Y is $CH_2CH(CH_3)CH_2$]

By reduction of the β-[10-(2-chlorophenothiazinyl)]α-methylpropionitrile described above in Example 8 with hydrogen over a Raney nickel catalyst according to the procedure described above in Example 17, there is obtained 3 - [10-(2-chlorophenothiazinyl)]-2-methylpropylamine.

11

Reaction of the latter with ethyl N,N-diallylisothiouronium bromide according to the procedure described above in Example 17 affords 3-[10-(2-chlorophenothiazinyl)]-2-methyl-N,N-diallylpropylguanidine.

EXAMPLE 20

6-[10-(2-chlorophenothiazinyl)]-N,N-dipropynylhexylguanidine [Ib: $R_1$ and $R_2$ are $CH_2C\equiv CH$; Y is $(CH_2)_6$]

By reduction of the ε-[10-(2-chlorophenothiazinyl)] capronitrile described above in Example 9 with hydrogen over a Raney nickel catalyst using the procedure described above in Example 17, there is obtained 6-[10-(2-chlorophenothiazinyl)]hexylamine.

By reaction of the latter with ethyl N,N-dipropynylisothiouronium bromide according to the procedure described above in Example 17, there is obtained 6-[10-(2-chlorophenothiazinyl)]-N,N-dipropynylhexylguanidine.

EXAMPLE 21

2-[10-(2-chlorophenothiazinyl)]-N-benzylethylguanidine [Ib: $R_1$ is H; $R_2$ is $C_6H_5CH_2$; Y is $CH_2CH_2$]

By reaction of the 2-[10-(2-chlorophenothiazinyl)]-ethylamine described above in Example 17 with ethyl N-benzyl isothiouronium bromide using the procedure described above in Example 17 there is obtained 2-[10-(2-chlorophenothiazinyl)]-N-benzylethylguanidine.

Similarly, reaction of the 2-[10-(2-chlorophenithiazinyl)]ethylamine described above in Example 17 with ethyl N-(4-methylmercaptobenzyl)isothiouronium bromide,
ethyl N-(4-methylsulfonylbenzyl)isothiouronium bromide, or
ethyl N-(4-trifluoromethylbenzyl)isothiouronium bromide affords, respectively,
2-[10-(2-chlorophenothiazinyl)]-N-(4-methylmecraptobenzyl)ethylguanidine,
2-[10-(2-chlorophenothiazinyl)]-N-(4-methylsulfonylbenzyl)ethylguanidine, or
2-[10-(2-chlorophenothiazinyl)]-N-(4-trifluoromethylbenzyl)ethylguanidine.

EXAMPLE 22

By reduction with hydrogen over a Raney nickel catalyst of the

β-[10-(2-trifluoromethylphenothiazinyl)]propionitrile,
β-[10-(2-sulfamoylphenothiazinyl)]propionitrile,
β-[10-(2-dimethylsulfamoylphenothiazinyl)]propionitrile,
β-[10-(3-cyanophenothiazinyl)]propionitrile,
β-[10-(2-acetylphenothiazinyl)]propionitrile,
β-[10-(2-methoxyphenothiazinyl)]propionitrile,
β-[10-(3-methylmercaptophenothiazinyl)]propionitrile,
β-[10-(2-methylphenothiazinyl)]propionitrile,
β-[10-(2-methylsulfonylphenothiazinyl)]propionitrile,
β-[10-(2-methylsulfinylphenothiazinyl)]propionitrile,
β-[10-(2-fluorophenothiazinyl)]propionitrile,
β-[10-(2,3-dimethoxyphenothiazinyl)]propionitrile, or
β-[10-(2,3-methylenedioxyphenothiazinyl)]propionitrile,
 there is obtained, respectively,
3-[10-(2-trifluoromethylphenothiazinyl)]propylamine,
3-[10-(2-sulfamoylphenothiazinyl)]propylamine,
3-[10-(2-dimethylsulfamoylphenothiazinyl)]propylamine,
3-[10-(3-cyanophenothiazinyl)]propylamine,
3-[10-(2-acetylphenothiazinyl)]propylamine,
3-[10-(2-methoxyphenothiazinyl)]propylamine,
3-[10-(3-methylmercaptophenothiazinyl)]propylamine,
3-[10-(2-methylphenothiazinyl)]propylamine,
3-[10-(2-methylsulfonylphenothiazinyl)]propylamine,
3-[10-(2-methylsulfinylphenothiazinyl)]propylamine,
3-[10-(2-fluorophenothiazinyl)]propylamine,
3-[10-(2,3-dimethoxyphenothiazinyl)]propylamine, or
3-[10-(2,3-methylenedioxyphenothiazinyl)]propylamine.

By reaction of the latter with ethyl isothiouronium bromide using the procedure described above in Example 17, there is obtained, respectively,

12

3-[10-(2-trifluoromethylphenothiazinyl)]propylguanidine,
3-[10-(2-sulfamoylphenothiazinyl)]propylguanidine,
3-[10-(2-dimethylsulfamoylphenothiazinyl)]propylguanidine,
3-[10-(3-cyanophenothiazinyl)]propylguanidine,
3-[10-(2-acetylphenothiazinyl)]propylguanidine,
3-[10-(2-methoxyphenothiazinyl)]propylguanidine,
3-[10-(3-methylmercaptophenothiazinyl)]propylguanidine,
3-[10-(2-methylphenothiazinyl)]propylguanidine,
3-[10-(2-methylsulfonylphenothiazinyl)]propylguanidine,
3-[10-(2-methylsulfinylphenothiazinyl)]propylguanidine,
3-[10-(2-fluorophenothiazinyl)]propylguanidine,
3-[10-(2,3-dimethoxyphenothiazinyl)]propylguanidine, or
3-[10-(2,3-methylenedioxyphenothiazinyl)]propylguanidine.

I claim:
1. A compound of the formula

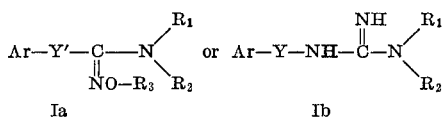

wherein
Ar is: 10-phenothiazinyl or 10-phenothiazinyl substituted by from one to two members of the group consisting of halogen, lower-alkyl, lower-alkoxy, lower-alkylmercapto, lower-alkylsulfinyl, lower-alkylsulfonyl, trifluoromethyl, methylenedioxy, lower-alkanoyl, cyano, sulfamoyl, and N,N-dilower-alkylsulfamoyl;

$R_1$ is: hydrogen, lower-alkyl, lower-alkenyl, lower-alkynyl, benzyl, lower-alkanoyl, benzoyl, or hydroxy;

$R_2$ is: hydrogen, lower-alkyl, lower-alkenyl, lower-alkynyl, or benzyl;

$R_3$ is: hydrogen, lower-alkanoyl, benzoyl, lower-alkyl, or benzyl;

Y is: alkylene of from two to six carbon atoms;

Y' is: alkylene or hydroxyalkylene of from one to five carbon atoms and having the hydroxy group attached to the carbon atom adjacent to the amidoxime group; and wherein the said lower-alkyl groups contain from one to four carbon atoms, and the said lower-alkenyl and lower-alkynyl groups contain from three to four carbon atoms.

2. A compound of Formula Ia according to claim 1 where $R_1$ and $R_2$ are hydrogen or lower-alkyl; $R_3$ is hydrogen; and Y' is alkylene of from one to two carbon atoms.

3. A compound of Formula Ia according to claim 1 where $R_1$ and $R_3$ are hydrogen; $R_2$ is lower-alkyl; and Y' is alkylene of from one to two carbon atoms.

4. A compound of Formula Ia according to claim 1 where $R_1$ and $R_2$ are each lower-alkyl; $R_3$ is hydrogen; and Y' is alkylene of from one to two carbon atoms.

5. A compound of Formula Ia according to claim 1 where $R_1$, $R_2$, and $R_3$ are each hydrogen; and Y' is alkylene of from one to two carbon atoms.

6. A compound according to claim 2 wherein the phenothiazine nucleus is substituted by a halogen atom.

7. A compound according to claim 3 wherein the phenothiazine nucleus is substituted by a halogen atom.

8. A compound according to claim 4 wherein the phenothiazine nucleus is substituted by a halogen atom.

9. A compound according to claim 5 wherein the phenothiazine nucleus is substituted by a halogen atom.

10. A compound according to claim 6 wherein the halogen atom is chlorine.

11. A compound according to claim 7 wherein the halogen atom is chlorine.

12. A compound according to claim 8 wherein the halogen atom is chlorine.

13. A compound according to claim 9 wherein the halogen atom is chlorine.

14. A compound of Formula Ib according to claim 1 wherein $R_1$ and $R_2$ are each hydrogen or lower-alkyl.

15. A compound of Formula Ib according to claim 1 wherein $R_1$ and $R_2$ are each lower-alkyl.

16. A compound of Formula Ib according to claim 1 wherein $R_1$ and $R_2$ are each hydrogen.

17. α-[10-(2-chlorophenothiazinyl)]acetamidoxime according to claim 13 wherein Y' is methylene, and the chlorine atom is in the 2-position of the phenothiazine nucleus.

18. β-[10-(2-chlorophenothiazinyl)]propionamidoxime according to claim 13 wherein Y' is 1,2-ethylene, and the chlorine atom is in the 2-position of the phenothiazine nucleus.

No references cited.

NORMA S. MILESTONE, Primary Examiner

H. I. MOATZ, Assistant Examiner

U.S. Cl. X.R.

424—247

UNITED STATES PATENT OFFICE
CERTIFICATE OF CORRECTION

Patent No. 3,590,038       Dated June 29, 1971

Inventor(s) Malcolm R. Bell

It is certified that error appears in the above-identified patent and that said Letters Patent are hereby corrected as shown below:

Column 1, line 53, "cyanohydrine" should read --cyanohydrin--.

Column 3, line 67, "lower-alky-" should read --lower-alkyl--.

Column 7, line 6, "and H" should read --are H--; line 41, "...(4-methylsulfonylbenbyl)" should read --...(4-methylsulfonylbenzyl)--; line 51, "Simplarly" should read --Similarly--; line 75, "catallyst" should read --catalyst--.

Column 11, line 8, "$CH_2C=CH$" should read --$CH_2C\equiv CH$--; line 8, "$(CH_2)_6$" should read --$(CH_2)_6$]--; lines 28-29, "...(2-chlorophenithiazinyl)]" should read --...(2-chlorophenothiazinyl)]--.

Claim 1, column 12, line 33, "and N,N-dilower-alkylsulfamoyl" should read --and N,N-di-lower-alkylsulfamoyl--.

Signed and sealed this 11th day of January 1972.

(SEAL)
Attest:

EDWARD M. FLETCHER, JR.
Attesting Officer

ROBERT GOTTSCHALK
Acting Commissioner of Patents